United States Patent
DeTemmerman et al.

(10) Patent No.: US 10,430,999 B2
(45) Date of Patent: Oct. 1, 2019

(54) COMPUTER-IMPLEMENTED METHOD FOR DESIGNING AN AVATAR WITH AT LEAST ONE GARMENT

(71) Applicant: Dassault Systemes, Velizy Villacoublay (FR)

(72) Inventors: Paul DeTemmerman, Nargis (FR); Pinghan Chen, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 65 days.

(21) Appl. No.: 14/945,106

(22) Filed: Nov. 18, 2015

(65) Prior Publication Data

US 2016/0163103 A1    Jun. 9, 2016

(30) Foreign Application Priority Data

Dec. 5, 2014 (EP) .................................... 14306954

(51) Int. Cl.
    *G06N 3/00*    (2006.01)
    *G06T 17/20*   (2006.01)
    *G06T 19/20*   (2011.01)

(52) U.S. Cl.
    CPC .......... *G06T 17/205* (2013.01); *G06N 3/006* (2013.01); *G06T 19/20* (2013.01); *G06T 2210/16* (2013.01); *G06T 2210/21* (2013.01); *G06T 2219/2004* (2013.01)

(58) Field of Classification Search
    CPC .................. G06T 2210/16; G06T 2210/21
    See application file for complete search history.

(56) References Cited

PUBLICATIONS

Bloomenthal, J.: Medial based vertex deformation. Proc. ACM SIGGRAPH/Eurographics Symposium on Computer Animation, pp. 147-151 (2002).*

(Continued)

*Primary Examiner* — Grace Q Li
(74) *Attorney, Agent, or Firm* — Hamilton, Brook, Smith & Reynolds, P.C.

(57) ABSTRACT

A computer-implemented method for designing an avatar with at least one garment, the method comprising the steps of:

S1) providing a digital model of an avatar comprising a skeleton (SN) and a skin (SK) covering the skeleton;

S2) providing a digital model of a garment (GT) comprising a mesh having a plurality of vertex (vg1-vg7) connected by edges defining faces, each vertex being associated to at least one bone (B1, B2) of the skeleton of the avatar through a respective weighting coefficient;

S3) associating a displacement direction (dd1-dd7) to each vertex of the garment, said displacement direction depending on the skeleton and on said weighting coefficients; and S4) detecting collisions between the skin of the avatar and the garment and, whenever a collision is detected, displacing a vertex of the garment away from the skeleton of the avatar along said displacement direction.

A computer program product, a computer-readable data storage means and a Computer Aided Design system for carrying out such a method, and an avatar wearing at least one garment, suitable to be designed by such a method.

13 Claims, 6 Drawing Sheets

(56) References Cited

PUBLICATIONS

Dongliang Zhang, Matthew M. F. Yuen, Collision Detection for Clothed Human Animation, Proceedings of the 8th Pacific Conference on Computer Graphics and Applications, p. 328, Oct. 3-5, 2000.*
EP Search Report for EP 14 30 6954 dated Aug. 17, 2015.
Remi Brouet et al: "Design preserving garment transfer", ACM Transactions on Graphics. vol. 31, No. 4, Jul. 2012 (Jul. 2012) pp. 1-11.
Peng Guan et al: "DRAPE: DRessing Any Person", ACM Transactions on Graphics, vol. 31, No. 4, Jul. 2012 (Jul. 2012), pp. 1-10.
Li J et al: "Fitting 3D garment models onto individual human models", Computers and Graphics, Elsevier, GB, vol. 34, No. 6, Dec. 2010 (Dec. 2010), pp. 742-755.
Yongjoon Lee et al: "Automatic pose-independent 3D garment fitting ", Computers & Graphics, vol. 37, No. 7, Nov. 2013 (Nov. 2013), pp. 911-922.

* cited by examiner

COMPUTER-IMPLEMENTED METHOD FOR DESIGNING AN AVATAR WITH AT LEAST ONE GARMENT

RELATED APPLICATION(S)

This application claims priority under 35 U.S.C. § 119 or 365 to European Application No. 14306954.0, filed Dec. 5, 2014. The entire teachings of the above application(s) are incorporated herein by reference.

FIELD OF THE INVENTION

The invention relates to a computer-implemented method for designing an avatar with at least one garment.

In the following, the word "avatar" will be used broadly to designate a computer-generated bi-dimensional or (most often) three-dimensional representation of a human or animal body, a humanoid or zoomorphic creature, or even a vegetable or an inanimate object. Most often, however, the avatar will be a representation of a human or humanoid body. Preferably, but not necessarily, avatars can be animated.

The word "garment" will refer to clothing or the like, including accessories such as hats, suitable to be worn by an avatar.

Hereafter, a "three-dimensional" (or "3D") object will be an object—or a digital model thereof—allowing a three-dimensional (3D) representation. A 3D representation allows the viewing of the part from all angles. For example, a 3D avatar or garment, when 3D represented, may be handled and turned around any of its axes, or around any axis in the screen on which the representation is displayed.

Conversely, a "two-dimensional" (or "2D") object will be an object—or a digital model thereof—only allowing a two-dimensional (2D) representation e.g. on a plane. For example, a 2D avatar or garment may only be translated in the plane of the screen on which the representation is displayed, or rotated around an axis perpendicular to said screen.

BACKGROUND

Avatars are used in many applications. One of them is computer-aided design: the designer needs them to simulate the interaction of a building, object, piece of furniture, machine or the like with people—e.g. to study the ergonomics of an airplane seat. Other applications are videogames and cinematographic animation. Therefore, graphic software often provides a library of predefined avatars and tools to configure them, e.g. by changing their morphology.

Most often, avatars wear clothes and sometimes accessories such as hats or jewels. This is required to obtain a realistic representation, and sometimes also for functional reasons (e.g. the ergonomics of a seat can be very different depending on the clothes worn by a user).

Both avatars and garments are usually represented by digital models stored in a library of a computer graphics system.

There is then a need for a tool allowing adapting the digital model of a garment to the morphology and size of an avatar. For example, the model of a dress has to be adapted to wearers of different sizes and morphologies. Ideally, if the morphology or size of the avatar is changed, the garment should adapt itself quickly and with minimal or no need for user intervention. In particular, such a software tool should be able to identify and solve "collisions" or "clash", i.e. situations where some parts of a garment are situated inside the body of the avatar.

Several approaches are known from the prior art to fulfill this need.

The paper by R. Brouet et al, "Design Preserving Garment Transfer", ACM Transaction of Graphics (TOG) Proceedings of ACM SIGGRAPH 2012 Volume 31 Issue 4, July 2012, describes a method which allows transferring a garment designed to be adapted to a "reference" body to a different "target" body. The main drawback of this method is that the reference body needs to be known: the method does not allow extracting a garment from a library and adapting it to an avatar. Moreover, it is complex, and therefore slow (several minutes of processor time may be required for adapting reasonably complex garments.

The DRAPE system, described in the paper by Peng Guan et al. "DRAPE: DRessing Any PErson"; ACM Trans. on Graphics (Proc. SIGGRAPH), 31(4):35:1-35:10, July 2012; is a complete system for animating clothes on synthetic bodies with different shapes and poses. It makes use of a model of clothing which is learned from a database of physics-based simulations. Applying this method to the problem considered here, where a garment has to be adapted to an indefinite number of different avatars, would be too complex. Moreover, it has been found that DRAPE can lead, in some cases, to unrealistic results. A subset of DRAPE, used for refining the fit of a garment, does not need such a database of physics-based simulation and can directly be applied to any mesh representing a garment. However it is only adapted to minor modifications of the avatar and it could not be used, for instance, to adapt a dress to a pregnant woman.

SUMMARY OF THE INVENTION

The invention aims at overcoming the above-mentioned drawbacks of the prior art. More particularly, it aims at providing a method of adapting a garment to an avatar which is simple and fast to implement, fully automatic and leading to visually plausible results in most cases.

According to the invention, this aim is achieved by a method based on skinning and skeletal animation, which is the technology behind character animation in many applications. According to this technology, an avatar is constituted by a skeleton and a skin, which is a mesh defining its surface. Each vertex of the mesh is attached to one or several bones of the skeleton, each attachment affecting the vertex with a different weighting coefficient ("skin weight"). When the skeleton is animated, the vertices of the skin follow the movements of the bones, each vertex taking a modified position which corresponds to its initial position transformed by a weighted average of the movements of all the bones to which it is attached, weighting being provided by the "skin weights".

An object of the present invention is then a computer-implemented method for designing an avatar with at least one garment, the method comprising the steps of:

S1) providing a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;

S2) providing a digital model of a garment comprising a mesh having a plurality of vertex connected by edges defining faces, each vertex being associated to at least one bone of the skeleton of the model of the avatar through a respective weighting coefficient;

S3) associating a displacement direction to each vertex of the mesh of the model of the garment, said displacement direction depending on the skeleton and on said weighting coefficients; and S4) detecting collisions between the skin of the model of the avatar and the meshes of the model of the garment and, whenever a collision is detected, displacing a vertex of the mesh of the model of the garment away from the skeleton of the model of the avatar along said displacement direction.

According to particular embodiments of such a method:

Said step S3) may comprise determining said displacement direction as a weighted average of directions, or vectors, connecting the nearest point of each bone to which said vertex is associated to the vertex itself, the weighted average being computed using the weighting coefficients associating the vertex to the bones.

Said step S4) may comprise the following sub-step:

S41) identifying vertices of the mesh of the model of the garment lying within said inside volume and displacing them along said displacement direction by a displacement sufficient to put them in the outside space.

In this case, a vertex of the mesh of the model of the garment lying within said inside volume may be identified by determining whether a ray, lying along the displacement region of said vertex, having its origin on the vertex itself and being oriented away from the skeleton of the model of the avatar, intersects a face of the skin of the model of the avatar and, in the affirmative, whether at least one of the vertices of said face is associated to a bone to which said vertex of the mesh of the model of the garment is also associated.

The method may also comprise the following sub-step, carried out after said sub-step S41):

S42) identifying collisions between the avatar and the garment due to edges of the mesh of the model of the garment intersecting faces of the skin of the model of the avatar, and solving said collisions by iteratively displacing a vertex of each said edge of the mesh of the model of the garment away from the skeleton along said displacement direction.

Furthermore, said sub-step S42) may comprise displacing, among the vertices of each edge of the mesh of the model of the garment intersecting a face of the skin of the model of the avatar, the one which has been displaced by a shortest cumulative distance.

The method may further comprise the following sub-step, carried out after said sub-step S42):

S43) identifying collisions between the avatar and the garment due to faces of the mesh of the model of the garment intersecting edges of the skin of the model of the avatar, and solving said collisions by iteratively displacing a vertex of each said face of the mesh of the model away from the skeleton along said displacement direction.

Furthermore, said sub-step S43) may comprise displacing, among the vertices of each face of the mesh of the model of the garment intersecting an edge of the skin of the model of the avatar, the one which has been displaced by the shortest cumulative distance.

Said sub-step S43) may be carried out after said sub-step S42).

The method may further comprise the following step, carried out iteratively:

S5) for each vertex of the model of the garment, determining if its cumulative displacement is lower than an average cumulative displacement of neighboring vertices and, in the affirmative, further displacing said vertex so that its cumulative displacement becomes equal to said average cumulative displacement.

The method may further comprise the following step:

S6) update said digital model of an avatar by including the mesh of said digital model of a garment as a part of its skin; whereby the method may be carried out iteratively to add successive garments to said avatar.

Another object of the invention is a computer program product, stored on a computer-readable data-storage medium, comprising computer-executable instructions to cause a computer system to carry out such a method.

Another object of the invention is a computer-readable data-storage medium containing (e.g., in a container) computer-executable instructions to cause a computer system to carry out such a method.

Another object of the invention is a Computer Aided Design system comprising a processor coupled to a memory and a graphical user interface, the memory storing computer-executable instructions to cause the Computer Aided Design system to carry out such a method.

Another object of the invention is an avatar wearing at least one garment, suitable to be designed by such a method.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Additional features and advantages of the present invention will become apparent from the subsequent description, taken in conjunction with the accompanying drawings, wherein.

DETAILED DESCRIPTION OF THE INVENTION

A description of example embodiments of the invention follows.

The teachings of all patents, published applications and references cited herein are incorporated by reference in their entirety.

Figure 1:
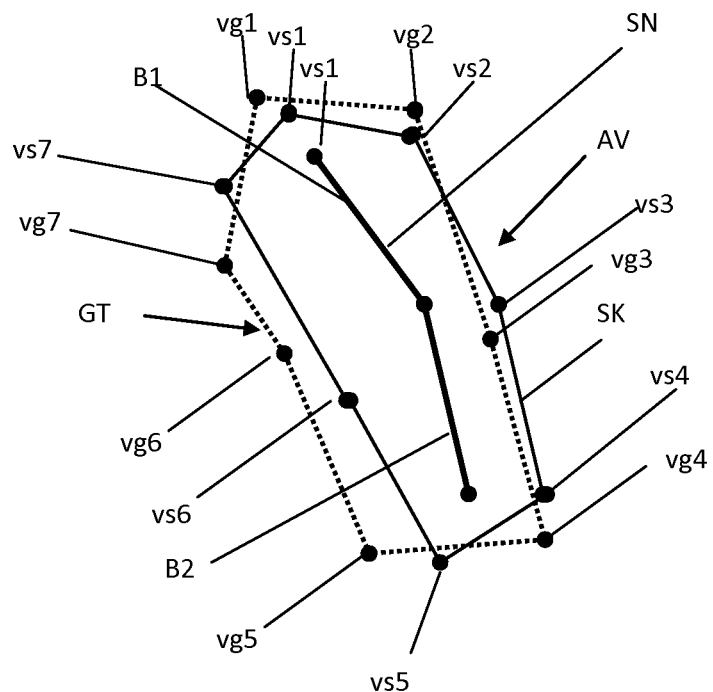
FIG. 1 is a very schematic representation of the digital models of an avatar and a garment according to an embodiment of the invention.

FIG. 1 illustrates the digital models of an exemplary 2D avatar AV—having a simple, geometrical shape—and of a garment GT.

The model of the avatar comprises a skeleton SN and a skin SK covering the skeleton. The skeleton comprises a set of bones, represented by concatenated straight segments (in the exemplary embodiment, the skeleton consists of two bones, B1 and B2). The skin is modeled or represented by a mesh comprising a set of vertices (vs1 to vs7) connected by edges. In a three-dimensional representation, edges would delimitate polygonal faces, but in two dimensions there is no distinction between edges and faces. The skin is not necessarily closed, but in any case it defines an inside volume of the avatar, containing the skeleton. Each vertex of the skin is associated to one or more bones of the skeleton through respective weighting coefficients. Although this is not apparent on FIG. 1, vertices vs1, vs2 and vs7 are associated to bone B1 only (i.e. with weighting coefficient equal to 1); vertices vs4, vs5 and vs6 are associated to bone B2 only, and vertex vs3 is associated to both bones B1 and B2 with weighting coefficients equals to 0.3 and 0.7, respectively (the sum of all the weighting coefficients of a vertex is normally taken equal to one).

Typically, the avatar is chosen from a library, and possibly it is modified by changing its morphology before being "dressed" by the addition of a garment. This is achieved by changing the length and the orientation of the bones. As mentioned above, the vertices of the skin "follow" the changes of the skeleton, depending on their weighting coefficient. Providing the avatar is illustrated as step S1) on the flow-charts of FIGS. 4 and 5.

The garment GT is also represented by a mesh comprising a set of vertices (vg1 to vg7) connected by edges. In a three-dimensional representation, edges would delimitate polygonal faces, but in two dimensions there is no distinction between edges and faces. As in the case of the skin SK, the vertices of the garment are associated to bones of the skeleton through respective weighting coefficients; advantageously, the weighting coefficients are freely chosen by the garment designer, and are part of the garment model. Although this is not apparent on FIG. 1, vertices vg1, vg2 and vg7 are associated to bone B1 only (i.e. with weighting coefficient equal to 1); vertices vg3, vg4 and vg5 are associated to bone B2 only, and vertex vg6 is associated to both bones B1 and B2 with equal weighting coefficients (0.5). On FIG. 1, the garment GT is represented as a closed polygonal curve, but most often a garment will define an open curve (in 2D) or surface (in 3D), and not a closed one as the skin.

Typically, the garment is chosen from a library, and has to be adapted to the avatar—which is the aim of the invention. Providing the garment is illustrated as step S2) on the flow-charts of FIGS. 4 and 5.

Figures 3A, 3B, 3C:
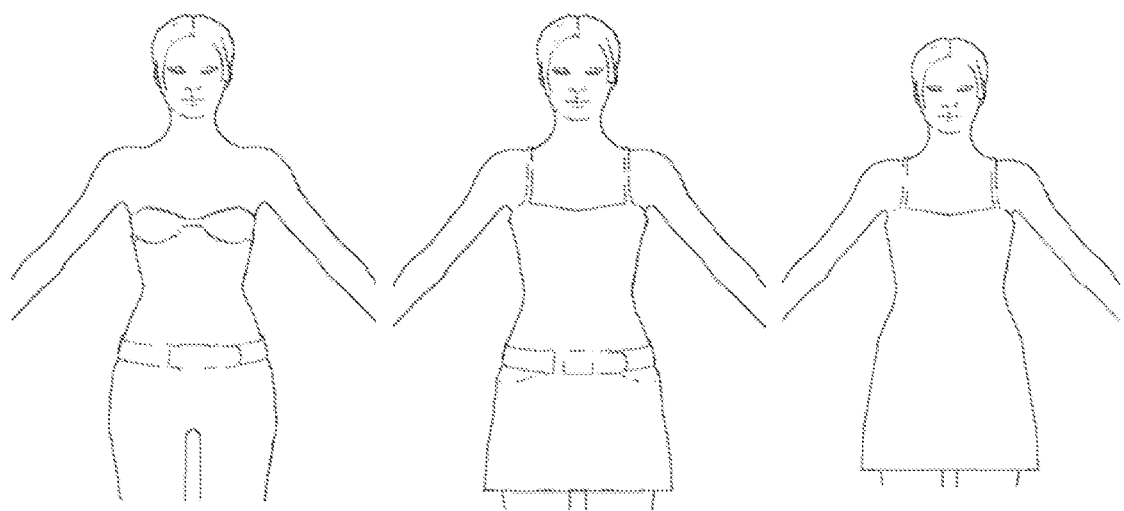
FIGS. 3A to 3C illustrate a technical result of the invention.

It can be seen on FIG. 1 that the skin of the avatar and the garment "collide", i.e. that some vertices, edges and/or faces of the garment lie at least in part within the inside volume. Otherwise stated, some edges of the garment intersect a face of the skin and/or some edges of the skin intersect a face of the garment (these cases are undistinguishable in 2D). FIG. 3B shows the effect of the collisions on a more realistic case.

It should be noted that the embodiment described here does not allow "shrinking" a garment which is too large for the avatar wearing it. In such a situation, an additional shrinking step (known by itself) should preferably be carried out before the step of detecting and solving collisions. According to the invention, the adaptation of the garment to the avatar is performed exclusively, or at least essentially, by detecting and solving collisions. By contrast, in the method disclosed by the above-referenced paper by R. Brouet et al, "Design Preserving Garment Transfer", a much more complex "proportional scaling" method is implemented, and solving collisions only constitutes a post-treatment.

FIG. 3A illustrates an avatar representing a woman wearing trousers, a belt and an underwear (which are considered part of its "skin"). On FIG. 3B, a garment—more precisely a dress—is added to the avatar. It can be seen that the belt "collides" with the garment, i.e. it is apparent while it should be covered, and therefore hidden, by the dress. FIG. 3C shows the dressed avatar after the application of a method according to the invention: the dress has been enlarged, so that it now covers the belt while retaining a natural and realistic appearance. According to the invention, this is achieved in an entirely automatic way. The algorithm implemented by the inventive method, allowing achieving the result of FIG. 3C, will now be described in detail with reference to FIGS. 2A-2D, 4 and 5.

Figure 4:
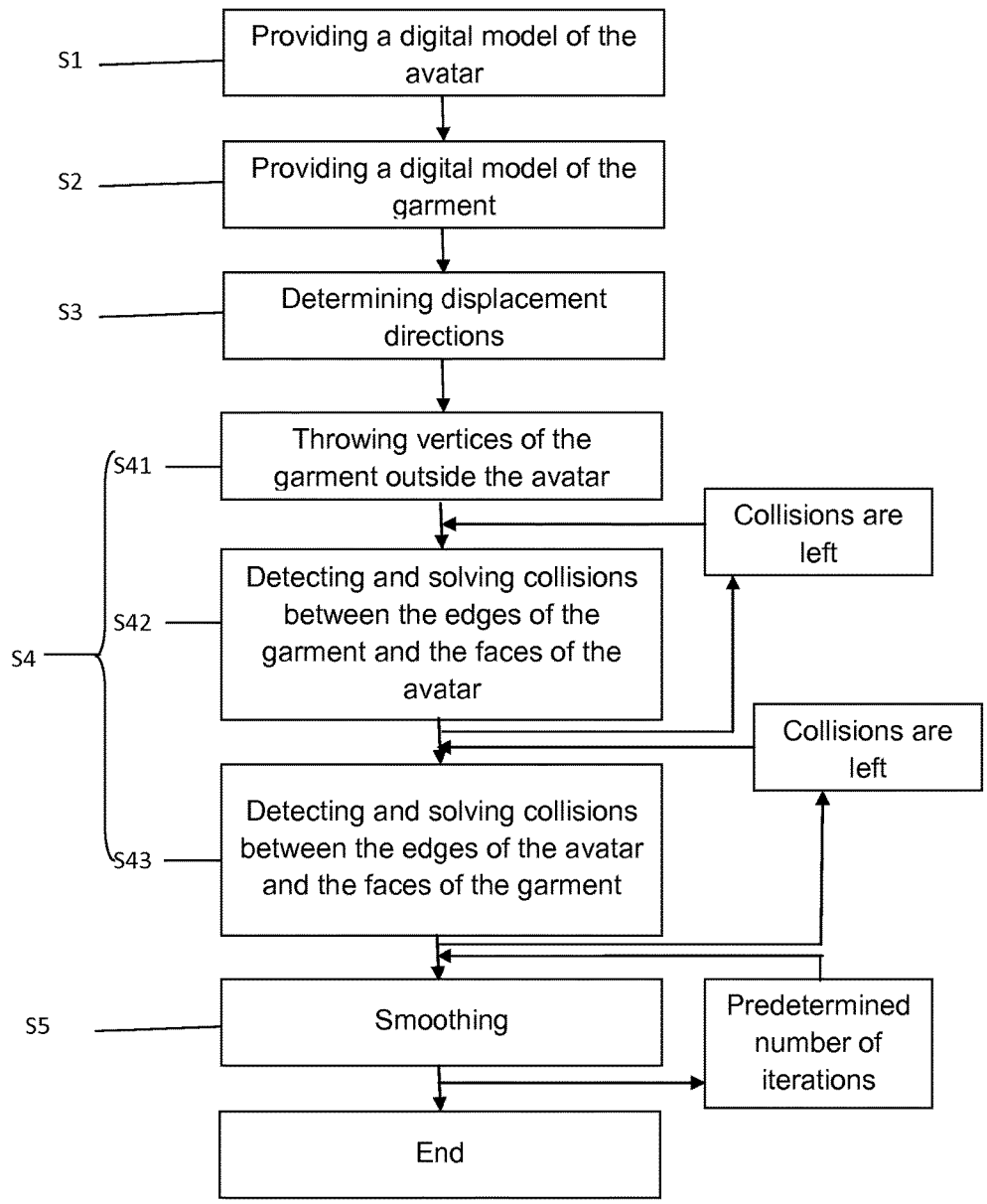
FIG. 4 is a flow-chart of a method according to an embodiment of the invention.
Figure 5:
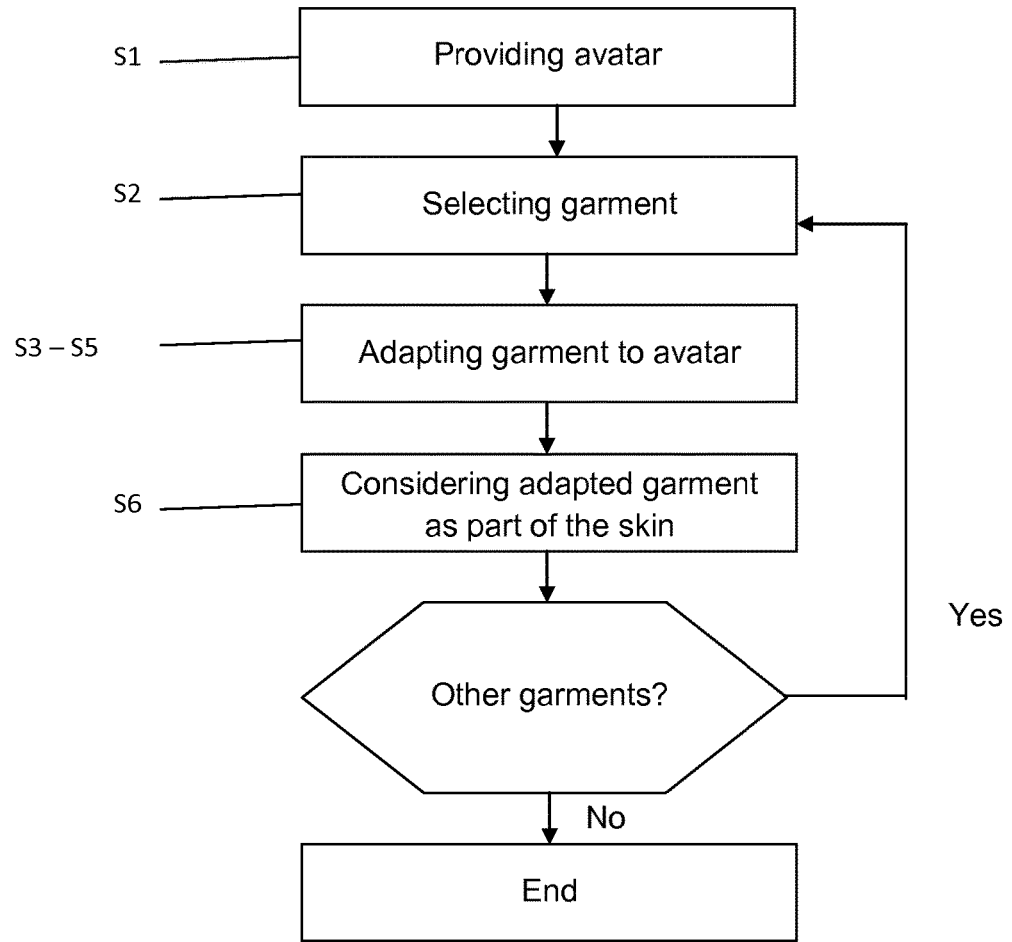
FIG. 5 is a flow-chart illustrating the application of a method according to an embodiment of the invention to the adaptation of multiple, layered garments to a same avatar.

As mentioned above, the first two steps of a method according to the embodiments of FIGS. 2A-2D, 4 and 5 consist in providing an avatar and a garment (or, more exactly, digital models thereof); these steps are denoted as steps S1) and S2) on the flow-charts of FIGS. 4 and 5.

The following step ("S3" on the flow-chart) consists in determining a displacement direction for each of the vertices of the model of the garment. For a given vertex, its displacement direction is computed as follows:

For each bone with a skin weight higher than 0, the algorithm computes a vector that goes from the nearest point of the bone to the vertex itself.

This vector is then normalized and then multiplied by the skin weight coefficient.

All the vectors computed for a vertex are summed up to make a single vector which is then divided by the sum of all the skin weights (which is usually 1).

Figure 2A:
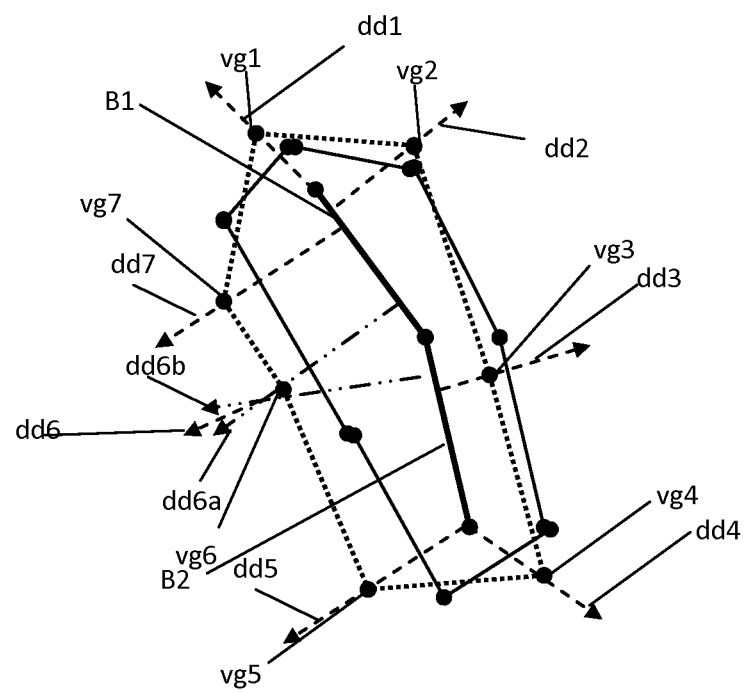
FIGS. 2A to 2D illustrate different steps of a method according to an embodiment of the invention, applied to the digital models of FIG. 1.

On FIG. 2A, the displacement direction associated to the ith vertex of the garment is labeled "ddi". As vertices vg1, vg2, vg3, vg4, vg5 and vg7 are associated to a single bone, the corresponding displacement directions dd1, dd2, dd3, dd4, dd5 and dd7 simply go from the nearest vertex of the associated bone (B1 for vg1, vg2 and vg7; B2 for vg3, vg4 and vg5). Vertex vg6 is associated to both bones with equal weight; therefore the displacement direction dd6 is intermediate between the vectors dd6a, dd6b going from the nearest point of B1 and B2, respectively, to the vertex itself. It is important to note that the displacement directions are always oriented outwardly from the skeleton.

In the following steps of the method ("S4"—including sub-steps "S41", "S42" and "S43"; "S4"), vertices of the garment are displaced in order to resolve collisions with the skin of the avatar while maintaining a realistic appearance of the garment. All these displacements are performed along the respective displacement directions identified at step S3), and more precisely along a "ray" lying along the displacement direction, oriented away from the avatar and having its origin at the initial position of the vertex. The position of a vertex during and after the modification of the garment can then be defined by a floating point number representing its cumulative displacement (i.e. the sum of all the individual displacements) along the ray. To avoid surcharging the drawings, no distinction is made on FIGS. 2A-2D between "displacement directions" and "rays".

Figure 2B:
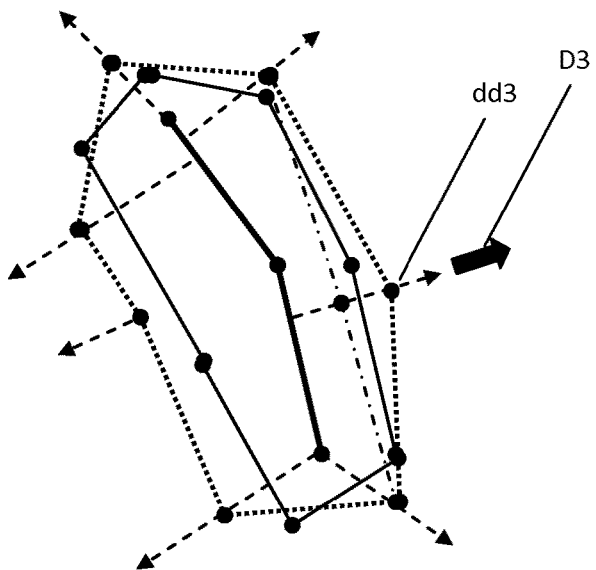

Sub-step S41), illustrated on FIG. 2B, consists in identifying the vertices of the garment which lie within the inside volume delimited by the skin, and displacing them along the displacement direction by a displacement sufficient to put them in the outside space.

Determining if a vertex of the garment lies within the inside volume requires determining if the ray associated to the vertex intersects a face of the skin of the avatar. In the affirmative, it is also necessary to determine if at least one of the vertices of said face is associated to a bone to which said vertex of the garment is also associated. Otherwise, a "false positive" might occur (i.e. a vertex could be wrongly considered as lying in the inner space) when a ray intersects a portion of the avatar skin different from that covered by the garment. For example, a ray leaving a vertex situated on the upper part of a trouser might intercept the skin of the hand of the avatar. Such a situation can be easily detected, as the trouser is not associated to the same bones as the skin of the hand.

Sub-step S42) aims at identifying and solving collisions between the edges of the garment and the faces of the skin of the avatar. Collision detection can be performed by known algorithms, see e.g. Ming C. Lin "Efficient Collision Detection for Animation and Robotics", PhD Thesis, University of California, Berkeley (1993).

Each time an intersection is detected, a vertex of the colliding edge is moved by a given offset (its cumulative displacement is increased) along the corresponding ray. Preferably, among the vertices of the colliding edge, the one with the lowest cumulative displacement is moved; if several edges have a same cumulative displacement, the choice may be pseudo-random. This sub-step is repeated until no collision is detected. If this step is repeated more than a predetermined number (e.g. 30) of times, the algorithm returns a failure.

Sub-step S43) aims at identifying and solving collisions between the edges of the skin of the avatar and the faces of the garment. It is basically the same as the previous sub-step, but this time it is a vertex of the face of the garment which is moved (again, preferably, among the vertices of the colliding face, it is the one with the lowest cumulative displacement which is moved). This sub-step is also repeated until all the collisions between the edges of the body and the faces of the garment are resolved, or until a predetermined maximal number of iteration has been performed.

The order of sub-steps «S42» and «S43» could be inverted; however it has been found that performing «S42» before «S43» reduces the number of iterations required, and therefore the computational cost.

Figure 2C:
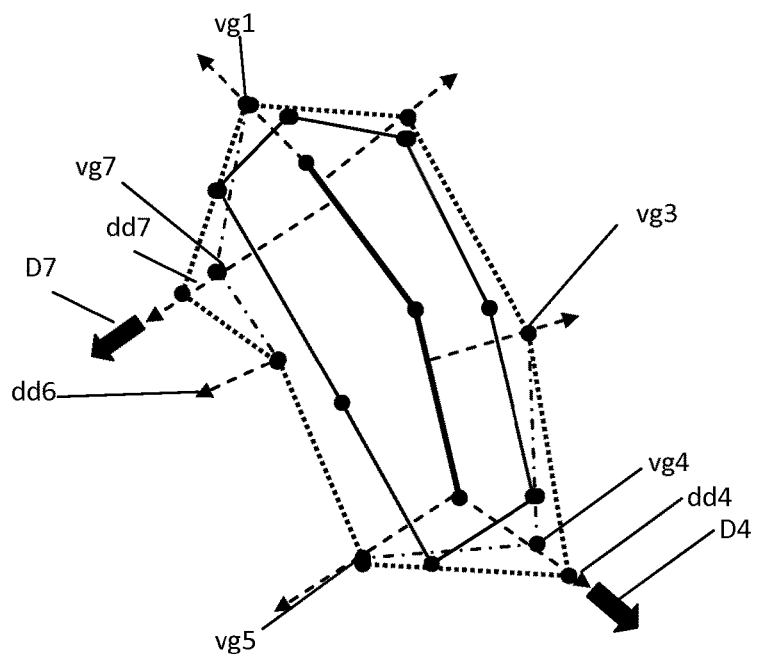

FIG. 2C illustrates sub-steps «S42» and «S43» (in 2D, there is no difference between "edges" and "faces", therefore the distinction between the two kinds of collisions is meaningless). The colliding edges of the garment are those comprised between vertices vg1 and vg7, and between vg4 and vg5. To solve these collisions, vertex vg7 is displaced by a cumulative displacement D7 and vg4 by a cumulative displacement D4.

It can be seen on FIG. 2C that the deformed garment is free from collisions, but has a somehow unnatural appearance as vertices vg4 and vg7 form spikes. Therefore, a smoothing step S5) is preferably performed. This is done by setting to each vertex a cumulative displacement which is the average of the ones of its neighbors, provided that said average cumulative displacement is greater than the "original" cumulative displacement of the vertex. This ensures that, like in the previous steps, the vertices only move outwardly, thus avoiding the creation of new collisions. This smoothing is iterated a predetermined number (e.g. 100) of times.

Figure 2D:
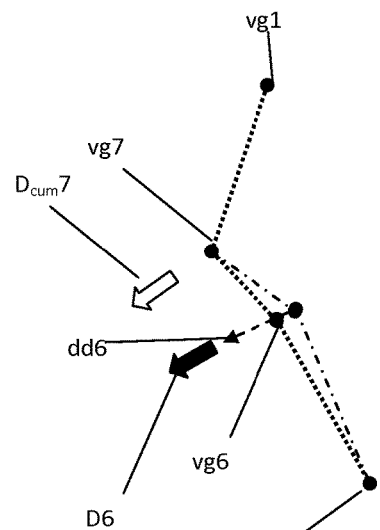

FIG. 2D illustrates the smoothing step S5) carried out on a portion of the garment GT. At the end of step S4), the cumulative displacement of vertex vg6 is zero, like that of vertex vg5; instead, the cumulative displacement of vertex vg7 is different from zero (see FIG. 2C) and its value is indicated by Dcum7. During the first iteration of step S5), vertex vg6 is displaced by the average of cumulative displacement of its neighbors vg5 and vg7—i.e. $(D_{cum}7+0)/2=D_{cum}7/2$—and its own cumulative displacement, which is zero. In conclusion, vg6 is displaced by $D6=D_{cum}7/2$. In a successive iteration vg5 will be displaced by the average of D6 and D4, and so on.

The algorithm defined above can be used to solve the collisions between an avatar and one garment. When this is done, the adapted garment can be incorporated to the model of the avatar, and more precisely to its skin (step "S6" on the flow-chart of FIG. 5), which allows the introduction of another garment and so on.

In conclusion, the inventive method allows performing multi-level garment adaptation very efficiently and without any user intervention nor any additional information other than the weighting coefficients. Moreover, as the garment contains skin weight information, the dressed avatar can directly be animated, the garments following the movements of the skeleton.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 6:
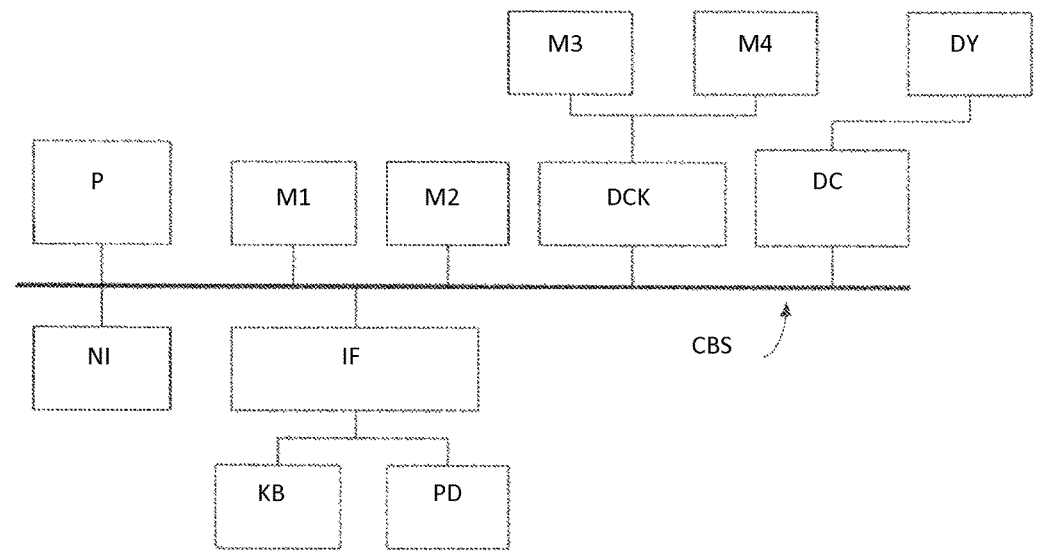
FIGS. 6 and 7 are block diagrams of respective computer system suitable for carrying out a method according to an embodiment of the invention.

A computer—more precisely a computer aided design station—suitable for carrying out a method according to an exemplary embodiment of the present invention is described with reference to FIG. 6. In FIG. 6, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. An avatar database and a garment database—i.e. organized sets of digital models of avatars and garments in a form suitable to be processed by the executable program according to the inventive method—are also stored on one or more of memory devices M1 to M4, or remotely.

The claimed invention is not limited by the form of the computer-readable media on which the computer-readable instructions and/or the avatar and garment databases of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 6 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 7:
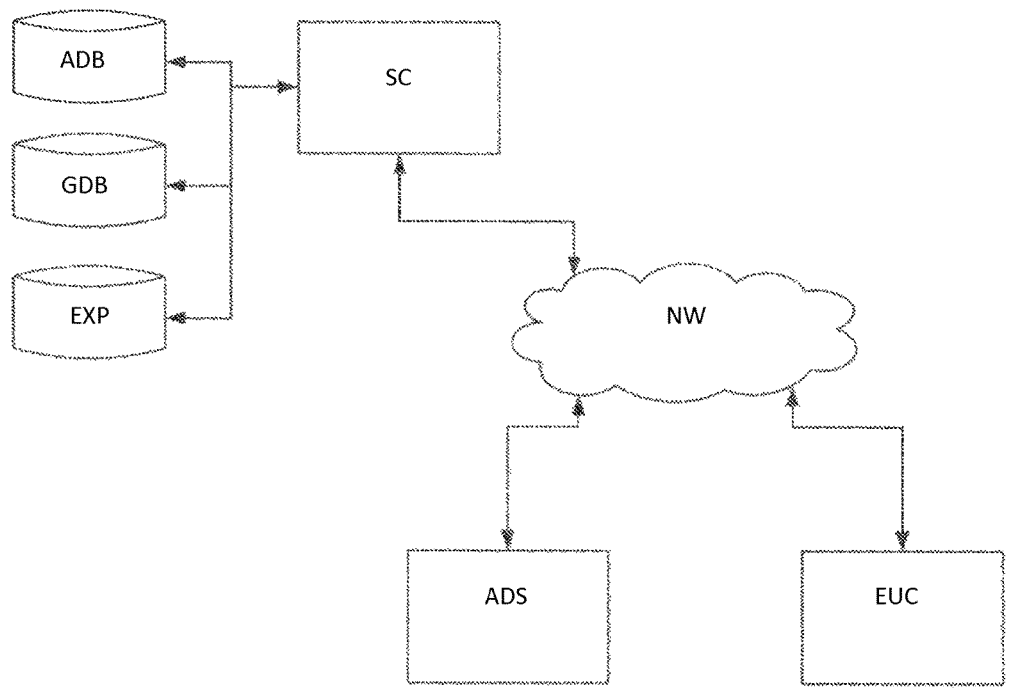

FIG. 7 is a block diagram of a computer system suitable for carrying out a method according to a different exemplary embodiment of the present invention.

In FIG. 7, the executable program EXP, the avatar database ADB and the garment database GDB are stored on memory devices connected to a server SC. The memory devices and the overall architecture of the server may be the same as discussed above with reference to FIG. 6, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 6, except that the memory devices of the administrator system and the end user computer do not store the executable program EXP, the avatar database ADB and the garment database GDB. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the avatar and garment databases on the server via the network NW. This allows an end user to select an avatar and one or more garment to be adapted for said avatar. It also allows the end user to send to the server instructions to change the morphology of the avatar and to dress it with the selected garment, arranged in a particular order. The server performs the processing as described above with reference to FIGS. 4 and 5, and transmits a digital model of the modified and dressed avatar to the end user computer, again using the network NW.

Although only one administrator system ADS and one end user system EUX are shown, the system can support any number of administrator systems and/or end user systems without limitation. Similarly, multiple servers, avatar databases and garment databases can also be implemented in the system without departing from the scope of the present invention Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing an avatar with at least one garment, the method comprising the steps of:

S1) providing a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;

S2) providing a digital model of a garment comprising a mesh having a plurality of vertex connected by edges defining faces, each vertex being associated to at least one bone of the skeleton of the digital model of the avatar through a respective weighting coefficient, the plurality of vertex of the digital model of the garment being not directly associated to the plurality of vertex of the skin of the digital model of the avatar, adding said digital model of the garment to the digital model of the avatar without deforming said digital model of the garment, the un-deformed digital model of the garment being without deformation relative to shape of said digital model of the garment prior to adding to the digital model of the avatar;

S3) associating a displacement direction to each vertex of the mesh of the un-deformed digital model of the garment, said displacement direction depending on the skeleton and on said weighting coefficients; and S4) detecting collisions between the skin of the model of the avatar and the meshes of the un-deformed model of the garment, and, whenever a collision is detected, displacing a vertex of the mesh of the model of the garment away from the skeleton of the model of the avatar along said displacement direction, wherein determining said displacement direction as a weighted average of vectors connecting nearest point of each bone to which said vertex is associated to the vertex itself, the weighted average being computed using the weighting coefficients associating the vertex to the bones, and wherein displacing the vertex includes displacing, among the vertices of each edge of the mesh of the model of the garment intersecting a face of the skin of the model of the avatar, the vertex with a lowest cumulative displacement.

2. The method of claim 1, wherein said step S4) comprises the following sub-step:
S41) identifying vertices of the mesh of the model of the garment lying within said inside volume and displacing them along said displacement direction by a displacement sufficient to put them in the outside space.

3. The method of claim 2, wherein a vertex of the mesh of the model of the garment lying within said inside volume is identified by determining whether a ray, lying along the displacement direction of said vertex, having its origin on the vertex itself and being oriented away from the skeleton of the model of the avatar, intersects a face of the skin of the model of the avatar and, in the affirmative, whether at least one of the vertices of said face is associated to a bone to which said vertex of the mesh of the model of the garment is also associated.

4. The method of claim 2, further comprising the following sub-step, carried out after said sub-step S41):
S42) identifying collisions between the avatar and the garment due to edges of the mesh of the model of the garment intersecting faces of the skin of the model of the avatar, and solving said collisions by iteratively displacing a vertex of each said edge of the mesh of the model of the garment away from the skeleton along said displacement direction.

5. The method of claim 4, further comprising the following sub-step, carried out after said sub-step S41):
S43) identifying collisions between the avatar and the garment due to faces of the mesh of the model of the garment intersecting edges of the skin of the model of the avatar, and solving said collisions by iteratively displacing a vertex of each said face of the mesh of the model away from the skeleton along said displacement direction.

6. The method of claim 5, wherein said sub-step S43) comprises displacing, among the vertices of each face of the mesh of the model of the garment intersecting an edge of the skin of the model of the avatar, the one which has been displaced by the shortest cumulative distance.

7. The method of claim 5, wherein said sub-step S43) is carried out after said sub-step S42).

8. The method of claim 1, further comprising the following step, carried out iteratively:
S5) for each vertex of the model of the garment, determining if its cumulative displacement is lower than an average cumulative displacement of neighboring vertices, the cumulative displacement of a vertex being a sum of all previous displacements of the vertex, and, in the affirmative, further displacing said vertex so that its cumulative displacement becomes equal to said average cumulative displacement.

9. The method of claim 1, further comprising the following step:
S6) update said digital model of an avatar by including the mesh of said digital model of a garment as a part of its skin;
whereby the method may be carried out iteratively to add successive garments to said avatar.

10. A computer-implemented method for designing an avatar with at least one garment, the method comprising the steps of:
S1) providing a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;
S2) providing a digital model of a garment comprising a mesh having a plurality of vertex connected by edges defining faces, each vertex being associated to at least one bone of the skeleton of the digital model of the avatar through a respective weighting coefficient, adding said digital model of the garment to the digital model of the avatar without deforming said digital model of the garment, the un-deformed digital model of the garment being without deformation relative to shape of said digital model of the garment prior to adding to the digital model of the avatar;
S3) associating a displacement direction to each vertex of the mesh of the un-deformed digital model of the garment, said displacement direction depending on the skeleton and on said weighting coefficients; and
S4) detecting collisions between the skin of the model of the avatar and the meshes of the un-deformed model of the garment, and, whenever a collision is detected, displacing a vertex of the mesh of the model of the garment away from the skeleton of the model of the avatar along said displacement direction, wherein determining said displacement direction as a weighted average of vectors connecting nearest point of each bone to which said vertex is associated to the vertex itself, the weighted average being computed using the weighting coefficients associating the vertex to the bones, wherein:
S41) identifying vertices of the mesh of the model of the garment lying within said inside volume and displacing the identified vertices along said displacement direction by a displacement sufficient to put the identified vertices in the outside space, and
S42) identifying collisions between the avatar and the garment due to edges of the mesh of the model of the garment intersecting faces of the skin of the model of the avatar, and solving said collisions by iteratively displacing a vertex of each said edge of the mesh of the model of the garment away from the skeleton along said displacement direction, wherein displacing, among the vertices of each edge of the mesh of the model of the garment intersecting a face of the skin of the model of the avatar, the one vertex which has been displaced by a shortest cumulative distance.

11. A computer program product, comprising:
a non-transitory computer-readable data-storage medium, storing computer-executable instructions to cause a computer system to design an avatar with at least one garment;
the computer-executable instructions causing the computer system to:
S1) provide a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;

S2) provide a digital model of a garment comprising a mesh having a plurality of vertex connected by edges defining faces, each vertex being associated to at least one bone of the skeleton of the digital model of the avatar through a respective weighting coefficient, the plurality of vertex of the digital model of the garment being not directly associated to the plurality of vertex of the skin of the digital model of the avatar, and adding said digital model of the garment to the digital model of the avatar without deforming said digital model of the garment, the un-deformed digital model of the garment being without deformation relative to shape of said digital model of the garment prior to adding to the digital model of the avatar;

S3) associate a displacement direction to each vertex of the mesh of the un-deformed digital model of the garment, said displacement direction depending on the skeleton and on said weighting coefficients; and S4) detect collisions between the skin of the model of the avatar and the meshes of the un-deformed model of the garment and, whenever a collision is detected, displacing a vertex of the mesh of the model of the garment away from the skeleton of the model of the avatar along said displacement direction, wherein determining said displacement direction as a weighted average of vectors connecting nearest point of each bone to which said vertex is associated to the vertex itself, the weighted average being computed using the weighting coefficients associating the vertex to the bones, and wherein displacing the vertex includes displacing, among the vertices of each edge of the mesh of the model of the garment intersecting a face of the skin of the model of the avatar, the vertex with a lowest cumulative displacement.

12. A non-transitory computer-readable data-storage medium comprising:

a container of computer-executable instructions causing a computer system to design an avatar with at least one garment;

the instructions including instructions for:

S1) providing a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;

S2) providing a digital model of a garment comprising a mesh having a plurality of vertex connected by edges defining faces, each vertex being associated to at least one bone of the skeleton of the digital model of the avatar through a respective weighting coefficient, the plurality of vertex of the digital model of the garment being not directly associated to the plurality of vertex of the skin of the digital model of the avatar, and adding said digital model of the garment to the digital model of the avatar without deforming said digital model of the garment, the un-deformed digital model of the garment being without deformation relative to shape of said digital model of the garment prior to adding to the digital model of the avatar;

S3) associating a displacement direction to each vertex of the mesh of the un-deformed digital model of the garment, said displacement direction depending on the skeleton and on said weighting coefficients; and S4) detecting collisions between the skin of the model of the avatar and the meshes of the un-deformed model of the garment and, whenever a collision is detected, displacing a vertex of the mesh of the model of the garment away from the skeleton of the model of the avatar along said displacement direction, wherein determining said displacement direction as a weighted average of vectors connecting nearest point of each bone to which said vertex is associated to the vertex itself, the weighted average being computed using the weighting coefficients associating the vertex to the bones, and wherein displacing the vertex includes displacing, among the vertices of each edge of the mesh of the model of the garment intersecting a face of the skin of the model of the avatar, the vertex with a lowest cumulative displacement.

13. A Computer Aided Design system comprising:

a processor coupled to a memory and a graphical user interface, the memory storing computer-executable instructions to cause the Computer Aided Design system to design an avatar with at least one garment, the memory including instructions of:

S1) providing a digital model of an avatar comprising a skeleton and a skin covering the skeleton, the skeleton comprising a plurality of bones represented by respective segments, the skin comprising a mesh comprising a plurality of vertex connected by edges defining faces, each vertex of the mesh being associated to at least one bone of the skeleton and the mesh defining an inside volume containing the skeleton;

S2) providing a digital model of a garment comprising a mesh having a plurality of vertex connected by edges defining faces, each vertex being associated to at least one bone of the skeleton of the digital model of the avatar through a respective weighting coefficient, the plurality of vertex of the digital model of the garment being not directly associated to the plurality of vertex of the skin of the digital model of the avatar, and adding said digital model of the garment to the digital model of the avatar without deforming said digital model of the garment, the un-deformed digital model of the garment being without deformation relative to shape of said digital model of the garment prior to adding to the digital model of the avatar;

S3) associating a displacement direction to each vertex of the mesh of the un-deformed digital model of the garment, said displacement direction depending on the skeleton and on said weighting coefficients; and S4) detecting collisions between the skin of the model of the avatar and the meshes of the un-deformed digital model of the garment and, whenever a collision is detected, displacing a vertex of the mesh of the model of the garment away from the skeleton of the model of the avatar along said displacement direction, wherein determining said displacement direction as a weighted average of vectors connecting the nearest point of each bone to which said vertex is associated to the vertex itself, the weighted average being computed using the weighting coefficients associating the vertex to the bones, and wherein displacing the vertex includes displacing, among the vertices of each edge of the mesh of the model of the garment intersecting a face of the skin of the model of the avatar, the vertex with a lowest cumulative displacement.

* * * * *